2,149,863

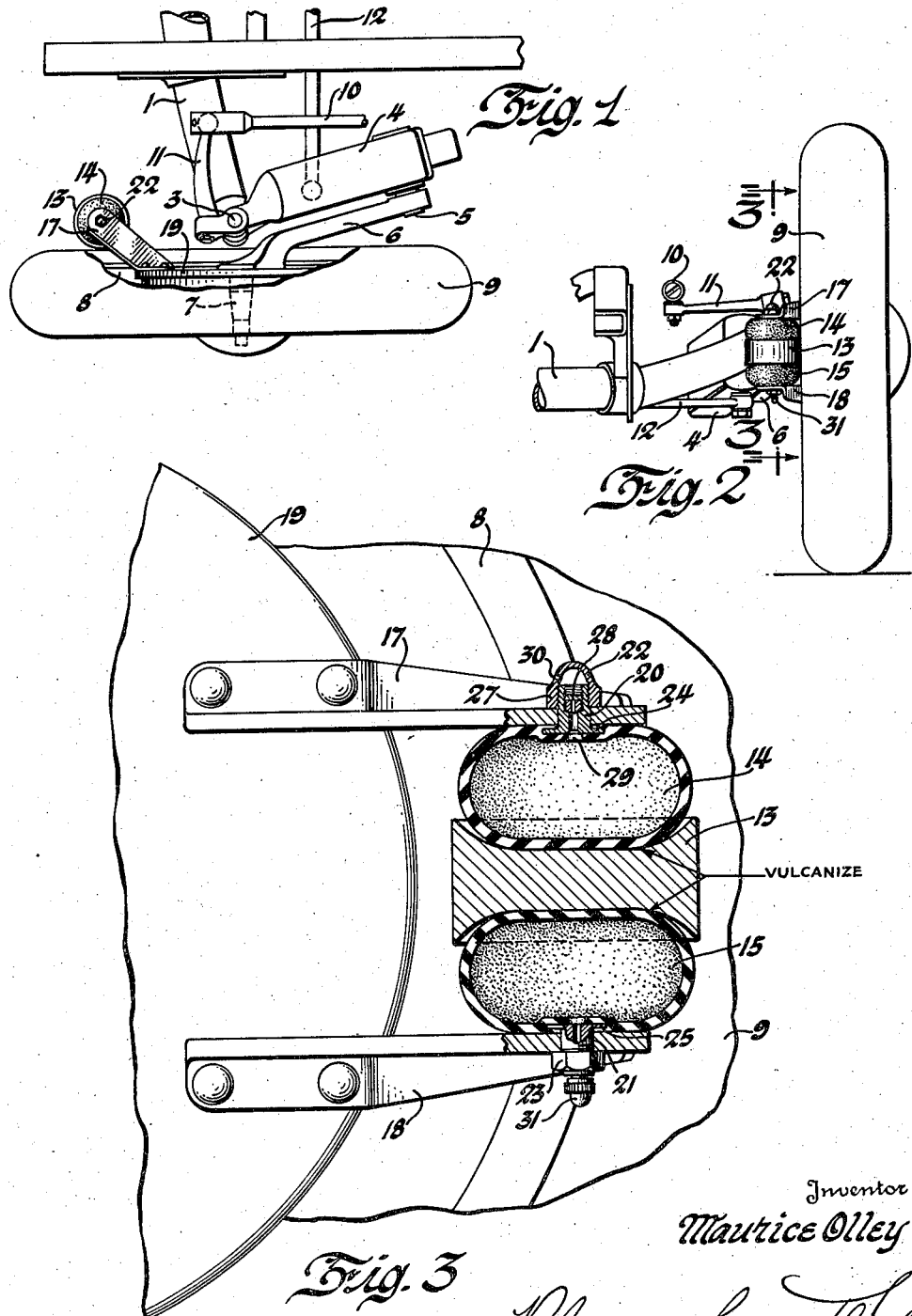
March 7, 1939. M. OLLEY 2,149,863
HARMONIC BALANCER FOR VEHICLE ROAD WHEELS
Filed July 6, 1937
Inventor
Maurice Olley Patented Mar. 7, 1939

UNITED STATES PATENT OFFICE 2,149,863

HARMONIC BALANCER FOR VEHICLE ROAD WHEELS

Maurice Olley, Detroit, Mich., assignor to General Motors Corporation, Detroit, Mich., a corporation of Delaware Application July 6, 1937, Serial No. 152,107

3 Claims. (Cl. 280—87)

This invention relates to motor vehicles and particularly to a harmonic balancer for damping the vertical oscillations of the road wheels relatively to the road.

In the conventional motor vehicle, the vehicle frame and the body are resiliently supported on the road wheel axles through suitable springs, and the whole vehicle including the frame, the body, the axles and the road wheels, is resiliently supported on the road through the pneumatic tires. Those parts of the vehicle which are supported on the springs constitute the so-called "sprung" mass and the wheels and their axles the so-called "unsprung" masses.

As the vehicle passes over road irregularities, there are oscillations of the whole vehicle relatively to the road at a frequency dependent on the combined rate of the springs and the tires, and of the wheels relatively to the road at a frequency dependent chiefly on the rate of the tires.

The foregoing oscillations may take place to some extent independently, and in every conceivable combination, depending on the circumstances, (i. e., the loading, the character of the roadway, the speed of the vehicle, etc.).

In the modern motor vehicle, low rate springs having considerable deflection are employed to reduce the frequency of the oscillations of the vehicle frame to a low and comfortable frequency. The wheels and parts constituting the "unsprung" mass are, however, resiliently supported on the road through the pneumatic tires which have a spring rate which is considerably higher than the rate of the suspension springs, dependent on the pressure and volume of the air they contain, and their deflection. The relative oscillations of the "sprung" and the "unsprung" masses of the vehicle, are usually damped on bump or rebound or both by suitable shock absorbers, but when the shock absorbers are such as to most effectively damp these low frequency oscillations of considerable amplitude, they are frequently less able to damp the higher frequency oscillations of the "unsprung" mass relatively to the road. These higher frequency oscillations may be such that there is actual bouncing of the tires on the road, which has been aptly described as "wheel hop". The effect is objectionable and to the extent that the tires leave the road, traction and control of the vehicle is lost. It is very desirable that "wheel hop" should be damped by means entirely unconnected with the vehicle frame, since by this means it is possible to avoid the high frequency reaction of the shock absorber on the frame which occurs when the shock absorber is checking wheel hop.

The object of the invention is a harmonic balancer of new and improved construction which can be mounted in any suitable position on each of the independently movable unsprung masses of a vehicle to set up a force in a direction opposing the force tending to cause "wheel hop" or vertical oscillations of the "unsprung" mass relatively to the road.

A further object of the invention is a harmonic balancer having pneumatic damping means.

A still further object of the invention is to apply the harmonic balancer to an independently suspended dirigible wheel in such a way that it will serve also to balance otherwise unbalanced forces tending to turn the wheel about its kingpin axis.

The above and other objects of the invention will be apparent as the description proceeds.

The drawing shows the application of the invention to an independently sprung dirigible wheel of that type in which a wheel supporting lever arm arranged longitudinally of the vehicle is mounted on a substantially horizontal pivot axis carried in a bracket which swings in a substantially horizontal plane about a substantially vertical kingpin mounted directly on the vehicle frame.

In the drawing:

Fig. 1 is a plan view of one of the dirigible front road wheels of a motor vehicle including part of the vehicle frame.

Fig. 2 is a front elevational view of Fig. 1.

Fig. 3 is an enlarged sectional view on line 3—3 of Fig. 2.

The vehicle frame includes a transverse member 1 rigidly attached thereto. Mounted at the end of the transverse member 1, for pivotal movement in a substantially horizontal plane about a pivot axis constituted by a kingpin 3, is a bracket 4.

The bracket 4 extends from the kingpin towards the rear of the vehicle, and at its rearward end provides support for the substantially horizontal pivot axis 5, of the wheel supporting lever arm 6, carrying a spindle 7, for the road wheel 8, with a pneumatic tire 9.

The bracket 4 is conveniently arranged to constitute a housing for suitable spring means (not shown), resiliently resisting pivotal movement of the wheel supporting lever arm relative to the bracket 4.

A drag link 10 from a conventional steering gear (not shown), is connected to a steering arm 11 attached to the bracket 4, and between the bracket 4 and the corresponding bracket for a wheel on the opposite side of the vehicle (not shown), is a tie rod 12, connecting together the wheels on opposite sides of the vehicle, for dirigible movement about their kingpin axes.

In the example illustrated, the wheel 8 and its lever arm 6 are unsprung and constitute part of the "unsprung" mass of the vehicle.

Rigidly attached to the "unsprung" mass of the vehicle in any suitable position is supporting means for the harmonic balancer.

As illustrated, this consists of a weight 13 resiliently held between a pair of air cushion springs 14 and 15 of rubber or other suitable resilient material, and capable of oscillating upwards and downwards against the resistance of the air cushion springs.

The weight 13 is vulcanized as indicated, to the air cushion springs 14 and 15, and the assembly consisting of the parts 13, 14 and 15 is held between brackets 17 and 18 which are rigidly attached to the brake backing plate 19 which is rigidly connected to the lever arm 6 and the spindle 7 of the wheel 8. The air cushion springs 14 and 15 are attached to the brackets 17 and 18 by bolts 20 and 21, provided with cap nuts 22 and 23, respectively. As shown the bolts 20 and 21 have thin flat heads 24 and 25, which are sprung into pockets in the walls of the rubber cushions, to which they may be vulcanized.

If desired, the oscillations of the weight 13 may be damped by providing for the influx and efflux of air at a restricted rate from the air cushion 14. For this purpose the bolt 20 may be bored, counterbored and screw threaded for a plug 27, having a calibrated orifice 28 permitting air to flow at a selected rate between the air cushion and the atmosphere, through holes 29 and 30, in the walls of the air cushion 14 and the cap nut 22, respectively.

The air cushion 15 may be provided with a tire valve 31 of conventional form, through which it may be inflated with air to the pressure required.

The harmonic balancer can be tuned to the frequency of the oscillations of the "unsprung" mass by varying the pressure in the air cushion 15 or by changing the degree of separation of the secured ends of the air cushions 14 and 15, as for example, by changing the distance apart of the brackets 17 and 18. Because of its inertia the weight 13 will through the air cushion springs 14 and 15 exert forces on the "unsprung" mass opposite in direction to the forces causing the oscillations of the unsprung mass, and by suitable proportioning of the parts of the harmonic balancer, the forces tending to cause wheel hop can be neutralized as they arise. It will be appreciated that the air cushions can be lighter in weight than equivalent metal springs so that they will but little increase the "unsprung" mass.

There is the further advantage that damping may be provided by causing the moving balance weight to pump air through orifices. This damping can be easily adjusted to requirements by adjusting the size of the orifice used.

While the invention is equally applicable to any type of vehicle wheel suspension, the drawing shows a particular arrangement as applied to a suspension system for a dirigible road wheel in which the masses which turn about the substantially vertical axis of the kingpin upon dirigible movement of the road wheel, are not equally disposed forwardly and rearwardly of the kingpin axis.

In such circumstances, when the vehicle is rounding a turn, there is a centrifugal moment tending to turn the wheel about the axis of the kingpin.

As illustrated, the essential parts of the suspension system result in a preponderance of mass to the rear of the kingpin axis.

According to the invention, the harmonic balancer is, with advantage, mounted in a position forwardly of the kingpin axis, such that in addition to its function as a harmonic balancer for vertical oscillations, it has a centrifugal moment opposing the centrifugal moment otherwise tending to turn the wheel about its kingpin axis.

I claim:

1. In a vehicle having a "sprung" mass resiliently supported on the spindle of a road wheel, said road wheel and associated parts constituting "unsprung" mass of the vehicle, harmonic balancing means operative to counteract forces tending to cause vertical oscillations of the "unsprung" mass relatively to the road, said means comprising a weight resiliently supported for vertical oscillation between a pair of vertically spaced air cushion springs carried by the "unsprung" mass, the lowermost of said air cushion springs being inflated with air to a desired pressure and the uppermost of said air cushion springs being provided with a restricted orifice to atmosphere for the influx and efflux of air at a selected rate, to damp the oscillations of the weight.

2. The combination according to claim 1, in which the road wheel and associated parts constituting the "unsprung" mass of the vehicle, includes a brake backing plate, the harmonic balancer being mounted on the brake backing plate.

3. In a vehicle having a "sprung" mass resiliently supported on the spindle of a road wheel mounted for dirigible movement about a substantially vertical pivot axis, the masses of the road wheel and associated parts being so disposed that when the vehicle is rounding a turn there is a centrifugal moment tending to turn the road wheel about the said axis, means to counteract forces tending to cause vertical oscillations relatively to the road, of the road wheel and associated parts constituting "unsprung" mass of the vehicle, said means comprising a weight resiliently supported for vertical oscillation between a pair of springs carried on brackets on the "unsprung" mass; said weight, springs, and brackets therefor, having such a mass and being so positioned relatively to the substantially vertical pivot axis, that when the vehicle is rounding a turn, they will have a centrifugal moment opposing and neutralizing the centrifugal moment otherwise tending to turn the wheel about its said axis.

MAURICE OLLEY.